(12) United States Patent
Wrobel et al.

(10) Patent No.: US 9,798,027 B2
(45) Date of Patent: Oct. 24, 2017

(54) METHOD FOR QUANTITATIVE DEFINITION OF DIRECT HYDROCARBON INDICATORS

(75) Inventors: Kelly Wrobel, Houston, TX (US); Matthias Imhof, Katy, TX (US); Martin J. Terrell, Spring, TX (US); Stefan Hussenoeder, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 545 days.

(21) Appl. No.: 14/353,743

(22) PCT Filed: Sep. 11, 2012

(86) PCT No.: PCT/US2012/054661
§ 371 (c)(1),
(2), (4) Date: Apr. 23, 2014

(87) PCT Pub. No.: WO2013/081708
PCT Pub. Date: Jun. 6, 2013

(65) Prior Publication Data
US 2014/0303896 A1    Oct. 9, 2014

Related U.S. Application Data

(60) Provisional application No. 61/564,670, filed on Nov. 29, 2011.

(51) Int. Cl.
    *G01V 1/30* (2006.01)
(52) U.S. Cl.
    CPC .............. *G01V 1/306* (2013.01); *G01V 1/307* (2013.01); *G01V 2210/632* (2013.01)
(58) Field of Classification Search
    CPC ... G01V 1/306; G01V 1/307; G01V 2210/632
    (Continued)

(56) References Cited

U.S. PATENT DOCUMENTS

| | | |
|---|---|---|
| 4,916,615 A | 4/1990 | Chittimeni |
| 4,992,995 A | 2/1991 | Favret |

(Continued)

FOREIGN PATENT DOCUMENTS

| | | |
|---|---|---|
| EP | 1110103 | 3/2007 |
| WO | WO 99/64896 | 12/1999 |

(Continued)

OTHER PUBLICATIONS

Aki, K. et al. (1980), "*Quantitative Seismology: Theory and Method*," Freeman and Co., pp. 153-154.

(Continued)

*Primary Examiner* — Ian J Lobo
(74) *Attorney, Agent, or Firm* — ExxonMobil Upstream Research Company, Law Department

(57) ABSTRACT

Method for automated and quantitative assessment of multiple direct hydrocarbon indicators ("DHI's") extracted from seismic data. DHI's are defined in a quantitative way (33), making possible a method of geophysical prospecting based on quantification of DHI anomalies. Instead of working in a particular spatial region of seismic data pre-defined as a hydrocarbon opportunity, the present invention works on entire data volumes derived from the measured seismic data (31), and identifies opportunities based on quantified DHI responses. In some embodiments, a series of algorithms utilizes the geophysical responses that cause DHI's to arise in seismic data to search entire data sets and identify hydrocarbon leads based on the presence of individual and/or combinations of DHI's (34).

17 Claims, 9 Drawing Sheets

(58) Field of Classification Search
USPC .................................. 367/38; 702/11, 13, 14
See application file for complete search history.

(56) References Cited

U.S. PATENT DOCUMENTS

| | | |
|---|---|---|
| 5,047,991 A | 9/1991 | Hsu |
| 5,265,192 A | 11/1993 | McCormack |
| 5,274,714 A | 12/1993 | Hutcheson et al. |
| 5,416,750 A | 5/1995 | Doyen et al. |
| 5,440,525 A | 8/1995 | Dey-Sarkar et al. |
| 5,444,619 A | 8/1995 | Hoskins et al. |
| 5,453,958 A | 9/1995 | Neff |
| 5,465,308 A | 11/1995 | Hutcheson et al. |
| 5,539,704 A | 7/1996 | Doyen et al. |
| 5,586,082 A | 12/1996 | Anderson et al. |
| 5,677,893 A | 10/1997 | de Hoop et al. |
| 5,784,334 A * | 7/1998 | Sena .................... G01V 1/301 367/38 |
| 5,852,588 A | 12/1998 | de Hoop et al. |
| 5,940,777 A | 8/1999 | Keskes |
| 6,052,650 A | 4/2000 | Assa et al. |
| 6,092,025 A | 7/2000 | Neff |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Onyia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,587,791 B2 | 7/2003 | Dablain et al. |
| 6,603,313 B1 | 8/2003 | Srnka |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pederson |
| 7,206,782 B1 | 4/2007 | Padgett |
| 7,222,023 B2 | 5/2007 | Laurenet et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,658,202 B2 | 2/2010 | Mueller et al. |
| 7,697,373 B1 | 4/2010 | Padgett |
| 7,743,006 B2 | 6/2010 | Woronow et al. |
| 7,869,955 B2 | 1/2011 | Zhang et al. |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,128,030 B2 | 3/2012 | Dannenberg |
| 8,219,322 B2 | 7/2012 | Monsen et al. |
| 8,326,542 B2 | 12/2012 | Chevion et al. |
| 8,346,695 B2 | 1/2013 | Peper et al. |
| 8,358,561 B2 | 1/2013 | Kelly et al. |
| 8,363,959 B2 | 1/2013 | Boiman et al. |
| 8,380,435 B2 | 2/2013 | Kumaran et al. |
| 8,385,603 B2 | 2/2013 | Beucher et al. |
| 8,447,525 B2 | 5/2013 | Pepper et al. |
| 8,463,551 B2 | 6/2013 | Aarre |
| 8,515,678 B2 | 8/2013 | Pepper et al. |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop |
| 2006/0184488 A1 | 8/2006 | Wentland |
| 2007/0067040 A1 | 3/2007 | Ferree |
| 2008/0123469 A1 | 5/2008 | Wibaux et al. |
| 2008/0270033 A1 | 10/2008 | Wiley et al. |
| 2009/0192718 A1 * | 7/2009 | Zhang .................... G01V 1/282 702/14 |
| 2010/0149917 A1 | 6/2010 | Imhof et al. |
| 2010/0174489 A1 | 7/2010 | Bryant et al. |
| 2010/0211363 A1 | 8/2010 | Dorn et al. |
| 2010/0245347 A1 | 9/2010 | Dorn et al. |
| 2011/0002194 A1 | 1/2011 | Imhof et al. |
| 2011/0048731 A1 | 3/2011 | Imhof et al. |
| 2011/0272161 A1 | 11/2011 | Kumaran et al. |
| 2011/0292764 A1 * | 12/2011 | Kelly .................... G01V 1/307 367/38 |
| 2011/0307178 A1 | 12/2011 | Hoekstra |
| 2012/0072116 A1 | 3/2012 | Dorn et al. |
| 2012/0090001 A1 | 4/2012 | Yen |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0138350 A1 | 5/2013 | Thachaparambil et al. |
| 2013/0158877 A1 | 6/2013 | Bakke et al. |

FOREIGN PATENT DOCUMENTS

| | | |
|---|---|---|
| WO | WO 2005/017564 | 2/2005 |
| WO | WO 2009/011735 | 1/2009 |
| WO | WO 2009/142872 | 11/2009 |
| WO | WO 2010/056424 | 5/2010 |
| WO | WO 2011005353 | 1/2011 |
| WO | WO 2011149609 | 12/2011 |

OTHER PUBLICATIONS

Sheriff, R.E. et al. (1995), "*Exploration Seismology,*" Cambridge University Press, 2nd Ed., pp. 415-418.

Shuey, R.T. (1985), "A simplification of the Zoeppritz equations," *Geophysics* 50(4), pp. 609-614.

Smith, G.C. et al. (1987), "Weighted stacking for rock property estimation and detection of gas," *Geophysical Prospecting* 35, pp. 993-1014.

* cited by examiner

METHOD FOR QUANTITATIVE DEFINITION OF DIRECT HYDROCARBON INDICATORS

CROSS-REFERENCE TO RELATED APPLICATION

This application is the National Stage entry under 35 U.S.C. 371 of PCT/US2012/054661 that published as WO 2013/081708 and was filed on 11 Sep. 2012, which claims the benefit of U.S. Provisional Application No. 61/564,670, filed on 29 Nov. 2011, entitled METHOD OF QUANTITATIVE DEFINITION OF DIRECT HYDROCARBON INDICATORS, each of which is incorporated by reference, in its entirety, for all purposes.

FIELD OF THE INVENTION

This invention relates generally to the field of geophysical prospecting of data for potential hydrocarbon opportunities and, more particularly, to seismic data analysis. Specifically, the invention is a system for quantitative Direct Hydrocarbon Indicator ("DHI") definition and analysis. The system builds on the geophysical nature of DHIs by applying pattern recognition technologies to produce quantified measures of these indicators. Synthesized results could, for instance, be in the form of a ranked list of leads based solely on the presence and quality of DHIs in seismic data.

BACKGROUND OF THE INVENTION

Direct Hydrocarbon Indicators (DHIs) arise from contrasts in properties between either hydrocarbon- and water-saturated portions of a reservoir or a hydrocarbon-saturated reservoir and its encasing seal (FIG. 1). Current practices for ranking a potential hydrocarbon opportunity based on DHIs in seismic data involve a rather subjective procedure applied to previously-identified leads.

However, any given hydrocarbon occurrence can be manifested in seismic data by a variety of indicators, making it particularly difficult to qualitatively assess the myriad of possible responses from varied combinations of DHIs. Vast knowledge of the geologic setting, geologic history, and reservoir type is required before one can even hypothesize what individual DHIs and/or combination of DHIs should be present for a particular lead.

Currently, DHI analyses are used as a tool to lend confidence to a hypothesis of hydrocarbon presence for a given lead (*Exploration Seismology*, Sheriff and Geldart, Cambridge University Press, 2$^{nd}$ ed., pp 415-418 (1995)). However, additional quantitative work can be done regarding definition of DHIs and analysis of their geologic/geophysical meaning. It is generally recognized that the more that is known about various DHI indicators and their manifestation in different geologic settings, the more DHIs can be manipulated to aid in the identification of hydrocarbon opportunities. What is needed is a system that can utilize DHIs to their full potential by putting no limits or assumptions on the DHI analysis process. Instead of looking for a defined set of indicators that is qualitatively assessed to determine the presence of hydrocarbons in a given setting, which is the traditional method of DHI analysis, it may be more productive to let the DHIs, in whatever combination they may be manifested, guide the interpreter to hydrocarbon opportunities. The present invention satisfies this need.

Following is a brief summary of some previous published approaches for solving the same or a similar technical problem.

U.S. Pat. No. 6,587,791, "System and method for assigning exploration risk to seismic attributes" to Dablain et al., discloses a method for assessing the geologic risk for hydrocarbon presence and hydrocarbon accumulation size. Direct Hydrocarbon Indicators derived from seismic data are used to qualify the presence and accumulation size.

PCT Patent Publication WO2009142872, "Seismic Horizon Skeletonization" by Imhof et al., discloses an automatic method to extract a large number of horizons from a seismic dataset. Moreover, it discloses a broad pattern recognition workflow that partitions a dataset, analyzes the regions, and ranks them according to their potential of containing hydrocarbons.

PCT Patent Publication WO2009011735, "Geologic Features From Curvelet Based Seismic Attributes" by Neelamani and Converse, discloses a method for the computation of hydrocarbon indicators or texture attributes that may be used for the identification of subsurface features.

PCT Patent Publication WO2010056424, "Windowed Statistical Analysis for Anomaly Detection in Geophysical Datasets" by Kumaran et al., discloses a method of partitioning to identify geologic features from geophysical or attribute data using windowed principal component analysis.

PCT Publication No. WO2011149609, "System for Seismic Hydrocarbon System Analysis" by Imhof et al., discloses a method to detect and rank potential hydrocarbon opportunities using seismic data.

U.S. Pat. No. 5,440,525, "Seismic data hydrocarbon indicator" to Dey Sarkar et al., discloses a method for processing seismic data using conventional amplitude versus offset techniques to obtain AB cross plots on a trace-by-trace basis that are then utilized to generate a display that provides indications of the locations of hydrocarbons.

U.S. Pat. No. 5,453,958, "Method for locating hydrocarbon reservoirs" to Neff, discloses a method to produce a display that indicates the location of hydrocarbons based on a calculation of change in seismic amplitude divided by dip magnitude at individual grid points.

U.S. Pat. No. 6,092,025, "Hydrocarbon edge detection using seismic amplitude" to Neff, discloses a computer implemented method to produce a display that indicates the location of hydrocarbons based on a calculation of change in seismic amplitude divided by dip magnitude at individual grid points.

EP Patent No. 1,110,103, "Method of Seismic Signal Processing" to Meldahl et al., discloses a method of processing seismic data that extracts information along the spatial direction of a body of interest thereby producing directional seismic attributes.

U.S. Pat. No. 6,603,313, "Remote Reservoir Resistivity Mapping" to Srnka et al., discloses a method for surface estimation of reservoir properties using electromagnetic responses to produce inverted vertical and horizontal resistivity depth images.

U.S. Pat. No. 6,735,526, "Method of combining directional seismic attributes using a supervised learning approach" to Meldahl et al., discloses a method of combining directional seismic attributes using a supervised learning approach which may include extracting information along the spatial direction of a body of interest.

U.S. Pat. No. 7,266,041, "Multi-attribute background relative scanning of 3D geophysical datasets for locally anomalous data points" to Padgett, discloses a method for scanning geophysical data sets to find anomalous geophysical responses that can be related to the presence of hydrocarbon or water bearing strata.

U.S. Pat. No. 7,206,782, "Method for deriving a GrAZ seismic attribute file" to Padgett, discloses a method for deriving a GrAZ seismic attribute file that utilizes horizon vectors and attribute vectors to ascertain if changes are occurring in a direction towards a surface datum for a given time and depth range.

U.S. Pat. No. 7,453,767, "Method for deriving a 3D GRAZ seismic attribute file" to Padgett, discloses a method of determining and analyzing spatial changes in the earth's subsurface. The method obtains seismic attribute data and corresponding 3D dip and azimuth volumes as well as 3D reliability volumes to identify regions likely to be proximal to a seismic flat spot and/or hydrocarbon.

U.S. Pat. No. 7,453,766, "Method for deriving 3D output volumes using summation along flat spot dip vectors" to Padgett, discloses a method that is an adaptation of that disclosed in U.S. Pat. No. 7,453,767.

U.S. Pat. No. 7,463,552, "Method for deriving 3D output volumes using filters derived from flat spot direction vectors" to Padgett, discloses a method that is an adaptation of that disclosed in U.S. Pat. No. 7,453,767.

U.S. Pat. No. 7,697,373, "Method for deriving 3D output volumes using dip vector analysis" to Padgett, discloses a method that is an adaptation of that disclosed in U.S. Pat. No. 7,453,767.

Other references include the following.

*Exploration Seismology* by Sheriff and Geldart, Cambridge University Press, 2$^{nd}$ ed., pages 415-418 (1995) presents an overview of the mechanisms behind the generation of and manifestations of hydrocarbon indicators in seismic data.

*Quantitative Seismology: Theory and Method*" by Aki and Richards, W.H. Freeman and Co., 153 (1980) discloses a method to approximate reflection amplitude as a function of offset and elastic rock properties.

"A simplification of the Zoeppritz equations" by Shuey, *Geophysics* 50, 609-614 (1985) discloses a method of simplification of the Zoeppritz equations to approximate amplitude change as a function of offset.

"Weighted stacking for rock property estimation and detection of gas" by Smith and Gidlow, *Geophysical Prospecting* 35, 993-1014 (1987) presents a method using approximations of the Zoeppritz equations and derived rock properties to produce a fluid factor volume indicative of the presence of gas.

SUMMARY OF THE INVENTION

The present disclosure features a quantitative DHI definition system. It presents a method of geophysical prospecting based on quantification of DHI anomalies. Instead of working in a particular region of seismic data pre-defined as a hydrocarbon opportunity, the present invention works on at least one entire data or derivative volume and identifies opportunities based on quantified DHI responses. In some embodiments, a series of algorithms utilizes the geophysical responses that cause DHIs to arise in seismic data to search entire data sets and identify hydrocarbon leads based on the presence of individual and/or combinations of DHIs. Application of this method to an increasing number of data sets representing more diverse geologic settings may result in substantial learning on the manifestation of DHIs and their integrated effects which can, in turn, be used to improve both quantitative analyses, such as those defined by this invention, and previously established, but qualitative, DHI analyses.

In one embodiment, the invention is an automated method for identifying subsurface locations with hydrocarbon potential from a seismic data volume, comprising (a) dividing the seismic data volume into two or more groupings, each grouping representing a different subsurface location; (b) using a computer to apply, to each of a plurality of the two or more groupings, one or more algorithms that define, in a quantitative way, and compute at least two direct hydrocarbon indicators from the seismic data; and (c) using the computer to evaluate the groupings for hydrocarbon potential based on applying one or more selected criteria to the computed direct hydrocarbon indicators.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

A Direct Hydrocarbon Indicator ("DHI") is a type of seismic amplitude anomaly, seismic event, or characteristic of seismic data that can occur in a hydrocarbon-bearing reservoir. A DHI indicator only hints at a potential hydrocarbon accumulation, however, as similar anomalies or seismic responses can also be the result of non-hydrocarbon-bearing geologic formations.

A variety of DHI indicators may be observed on seismic data including, but not limited to: (1) amplitude strength (amplitude relative to background), (2) amplitude variation with offset (AVO) or amplitude variation with angle (AVA), (3) fluid contact reflections or amplitude flat spots, (4) amplitude fit-to-structure, (5) lateral amplitude contrast (amplitude relative to that of laterally equivalent stratigraphy), and (6) abrupt down-dip terminations in amplitude. Other indicators that can be incorporated into the DHI definition system include, but are not limited to: gas chimneys, velocity sags, frequency attenuation, and anomalies obtained from other non-seismic geophysical methods such as electrical resistivity anomalies (e.g., U.S. Pat. No. 6,603,313, "Remote Reservoir Resistivity Mapping" to Srnka).

Figure 1:
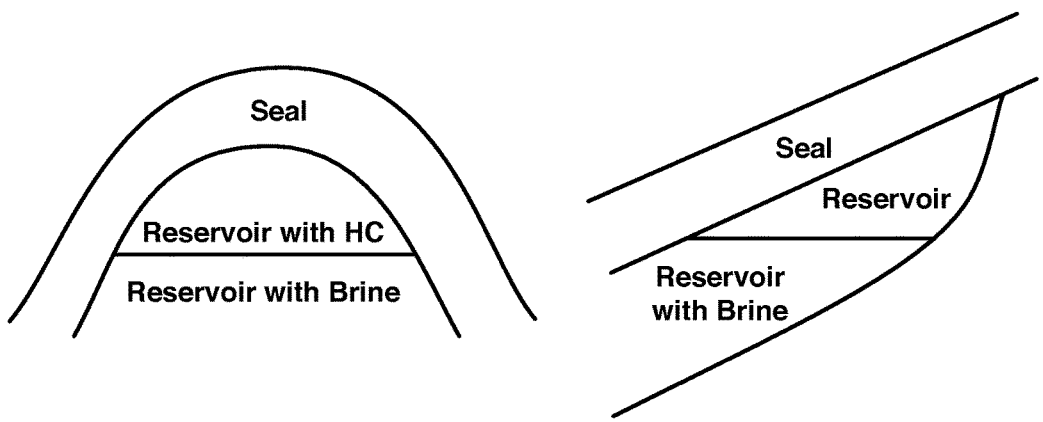
FIG. 1 is a graphical depiction of interfaces at which DHIs may be manifested.

DHIs arise from the contrast in properties between hydrocarbon- and water-saturated portions of a reservoir and/or between a hydrocarbon saturated reservoir and its encasing seal, as shown in FIG. 1. While the acoustic impedance (product of density and speed of compressional wave sound energy through the media) of hydrocarbon is always lower than that of brine, the size of the contrast can vary. In addition, other factors, e.g., consolidation state of reservoir material, can result in significant contrasts between a hydrocarbon saturated reservoir and an encasing seal, generating unpredictability in the seismic characteristics indicative of hydrocarbon, i.e. the DHIs.

DHI analyses, as currently practiced, are neither the domain of the specialist nor the generalist, but a combined effort applied to lead characterization and risking. In their application, current DHI analyses are aimed to extract from an observed response in seismic data those factors that suggest, and increase confidence in, the presence of hydrocarbons. One crucial aspect of such analyses is the consideration of DHIs not individually but in various combinations, with continual integration of the consequences of one observed indicator on the presence or lack of other indicators.

Much can be learned about how and when DHIs arise from their geophysical definitions. The fact that any given hydrocarbon occurrence can be manifested by some combination of DHI indicators can be advantageous if viewed quantitatively. Instead of qualitatively assessing a lead (identified by some other means) using a hypothesized combination of DHI indicators, the indicators can be used up front to identify the best hydrocarbon opportunities by guiding an interpreter to the most prospective regions in the data.

Current practice is twofold. First, DHI indicators are used to risk leads obtained with other methods. A lead is a region in which hydrocarbons are suspected to exist or in which hydrocarbons are predicted to exist. For example, an interpreter analyzes and identifies an anticlinal structure that could contain hydrocarbons. Experience shows, however, that many such structures are filled with water instead of hydrocarbons. Other anticlinal structures may not contain any fluid because the rock pores are clogged with minerals. Thus, the interpreter may analyze seismic data at the lead location to determine whether there is any geophysical indication of hydrocarbons, i.e., the interpreter may examine the seismic data at the lead location for existence of DHI indicators, augmenting the geological indications of hydrocarbons with geophysical ones. DHI indicators are thus used to identify leads with the largest chance of success.

The other mode of application of DHI indicators is identification of a potential lead from an anomaly, such as extremely bright amplitudes (amplitude strength), a bright planar event (flat spot), or specific AVO behavior.

What is not done, however, is systematic scanning of the data using a computer algorithm to identify locations where multiple DHI indicators occur simultaneously. One embodiment of the novel method is a system that quantifies at least two such DHI definitions and returns locations where specific criteria are satisfied. One reason for the lack of such a system is that many direct hydrocarbon indicators (or DHI indicators) are defined in a qualitative manner that does not translate to a DHI definition computable with an algorithm. To emphasize this distinction: a traditional DHI indicator is often defined in a qualitative manner, or being blunt, "you recognize it when you see it". The novel DHI definitions disclosed herein are defined in a quantitative manner that facilitates their computation with a computer algorithm.

Thus, specific embodiments of the inventive system disclose quantitative definitions and associated algorithms to compute DHI definitions. Moreover, the disclosed DHI definitions are a basis for the present inventive method and system, as indicated in the schematic diagram of FIG. 2. Because DHI definitions are computable at specified locations within a seismic dataset, a computer may be programmed to automatically scan seismic data for locations where a specified set of DHI definitions best match a specified criteria of success. Thus, entire seismic data sets can be searched in this manner, with highlighting of the most prospective regions as revealed by the presence of individual DHI indicators and/or combinations of DHI indicators, with the DHI indicators identified using quantitative geophysical definitions such as those disclosed herein. The results from the present invention optionally can in turn be used to learn more about DHI indicators and combinations thereof as they may appear in various geologic settings, therefore aiding future rankings/ratings of known hydrocarbon leads.

Figure 3:
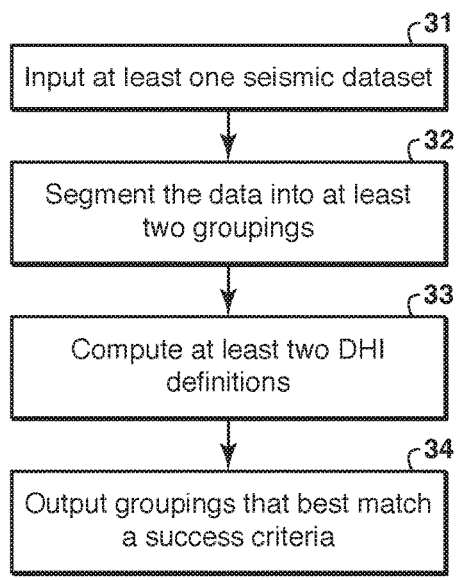
FIG. 3 is a flowchart showing basic steps in one embodiment of the present inventive method.

Basic steps in one embodiment of the present disclosure are shown in the flowchart of FIG. 3. First (step 31), at least one seismic data volume is inputted to the system. At step 32, the data volume is segmented into at least two groupings. At step 33, at least two quantitative DHI definitions are computed for these groupings. Each DHI value for a particular grouping may be a single measure computed for the entire grouping, or may be based on computation of the DHI measure at multiple locations, or cells, within the grouping. Various embodiments for the computation of DHI definitions are disclosed herein. Preferably, the computation of the DHI definitions is guided by available a-priori information and user input. At step 34, the one or more groupings that best match at least one specified criteria of success are outputted.

The present inventive method preferably uses as input a seismic data volume, i.e., a three-dimensional dataset. The novel DHI definitions disclosed herein are taught in a three-dimensional context. These definitions, however, can be reduced from three dimensions to two dimensions and the inventive system can be utilized on two-dimensional seismic sections. For simplicity, the term 'data volume' is used to teach the inventive system with the understanding that the datasets can be three-dimensional data volumes, two-dimensional sections, or a grid of (intersecting) two-dimensional sections.

The subsurface is partitioned into at least two groupings for analysis and, if warranted, a background that contains the space not being analyzed. One preferred method for grouping the subsurface for analysis and ranking is to declare each sample to be its own grouping. Another preferred method is grouping around essentially every sample of the dataset; a grouping now consists of a little neighborhood anchored at a sample point. These particular groupings consist of overlapping regions. Other methods of groupings include, but are not limited to: (1) blocking the subsurface into larger non-overlapping regions, (2) defining groupings by another earth model, for example using the cells of a collocated geologic model or reservoir flow model, and (3) grouping based on a secondary set of attributes of the seismic data. Details of the groupings are largely irrelevant for the inventive method.

A practitioner of the art will appreciate that the steps, as presented in FIG. 3, can be performed in series, in parallel, or in any combination thereof, and can be used repeatedly. Furthermore, some of the disclosed definitions benefit from auxiliary seismic attributes or information that may be inputted separately, be computed in a separate step, or be computed on the fly when needed. Next, a list is presented, not intended to be exhaustive, of DHI's suitable for use in the present invention.

Amplitude Anomaly Strength

Since the elastic properties of reservoirs filled with hydrocarbons are ideally different from those filled with brine or those of non-reservoir, the hydrocarbon saturated rocks in the reservoir should generate a distinct seismic response. The degree to which a seismic response is distinct, or anomalous, can, in turn, provide a measure of the likelihood that that anomaly is an indicator of hydrocarbon.

The DHI definition system could include an algorithm that searches an entire seismic data volume and identifies reflections that have anomalously low or high amplitudes with respect to average surrounding background amplitudes. The discovered anomalies are sorted by magnitude to distinguish those most likely to be indicative of hydrocarbon. For this particular DHI indicator, the algorithm may be written to segment the seismic data volume in some geologically-meaningful way such that individual surfaces representative of reflection events can be analyzed with respect to surrounding background amplitudes. One preferred method of such partitioning is skeletonization (PCT Patent Publication WO2009142872, "Seismic Horizon Skeletonization" by Imhof et al.), where every individual reflection event in the data is represented as a surface. The final result of the amplitude anomaly calculation is a collection of surfaces (each representative of a particular reflection event in the seismic data) that demonstrate the largest anomalous amplitudes with respect to background amplitudes.

Amplitude Versus Offset (AVO)

Another measure of the degree to which a seismic response is anomalous is how its amplitude varies as a function of offset, or distance between the seismic source and receiver. Amplitude strength and amplitude variation with offset (AVO) together provide an indication of the underlying elastic rock properties that give rise to an anomaly.

AVO volumes are commonly produced by mathematically manipulating near-offset seismic volumes (energy traveling at an angle of ~0° to ~5° from vertical in the subsurface) and far-offset seismic volumes (~30° to ~45°), and sometimes mid-offset volumes (~10° to ~25° between source and receiver), in a way that describes how the amplitudes are varying at any given location between the volumes.

How amplitude varies with offset is dependent on changes in the velocity of compressional and shear wave energy and density across an interface, such as the boundary between a sealing formation and a reservoir formation filled with brine or hydrocarbons (e.g., *Quantitative Seismology: Theory and Methods* by Aki and Richards, W.H. Freeman and Co., 153 (1980)). For example, AVO is often used as a hydrocarbon gas indicator because gas generally increases amplitude with increasing angle/offset. Other conditions, however, can produce similar effects. When the amplitude R of an event is plotted as a function of the incident angle θ, or offset x, (See FIG. 4), the slope A and gradient B of a best-fit curve through the data can be used for measurements of AVO. The resulting amplitude versus angle relationship is fitted by $R(\theta) \approx A + B \sin^2 \theta$ ("A simplification of the Zoeppritz equations" by Shuey, *Geophysics* 50, 609-614 (1985)).

Figure 4:
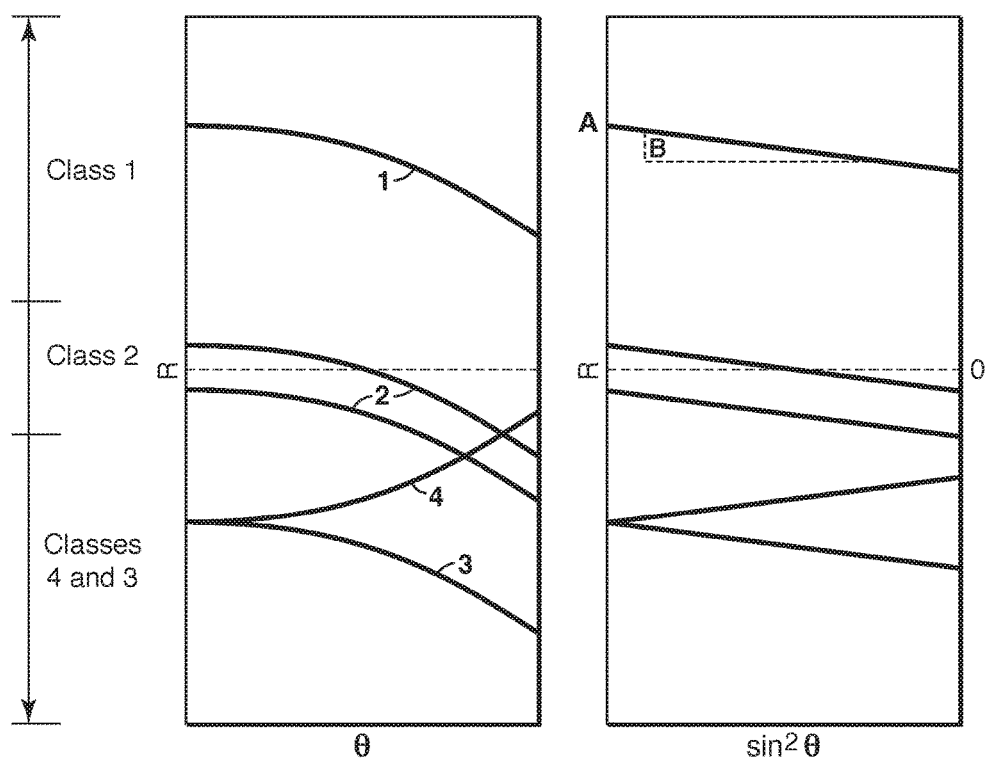
FIG. 4 illustrates the definition of AVO indicators and classes.

Class 1 reservoirs have higher impedance than the surrounding rocks and exhibit decreasing amplitude with offset. Class 2 reservoirs are those with very small, either positive or negative, impedance contrasts that sometimes exhibit very slight increases in amplitude with offset, occasionally accompanied by a phase reversal. Class 3 reservoirs are low-impedance reservoirs that increase in amplitude with offset. Finally, Class 4 reservoirs are also low in impedance, but their reflection amplitude decreases with offset in contrast to Class 3 reservoirs (FIG. 4).

AVO is the one attribute in DHI analyses that has been previously analyzed in a quantitative, volumetric manner. In general, the traditional AVO technique is to use an unpartitioned AVO data volume to aid in ranking/rating an already-identified lead. The current invention instead uses the AVO volume in a different way: to help identify potential hydrocarbon opportunities based on strong AVO responses from one or more of the segmented groupings of step 32. This approach allows for detailed analyses of trends in AVO behaviors; such analyses are preferably performed within neighborhoods defined based on local dip. AVO calculations applied here may include, but are not limited to: (1) A/B, (2) A*B, (3) A+B, (4) A-B volumes, (5) fluid factor volumes (e.g, "Weighted stacking for rock property estimation and detection of gas" by Smith and Gidlow, *Geophysical Prospecting* 35, 993-1014 (1987)), (6) A–γB volumes where γ=Vp/Vs, or (7) AVO envelope volumes (e.g., (env.=(zero phase)$^2$+(quadrature)$^2$)$^{1/2}$: AVO env.=(env(far)–env(near))*env(far)).

Amplitude Flat Spots or Fluid Contact Reflections

Fluid stratification occurs because of the density differences between hydrocarbons and brines. With rare exceptions, this phenomenon produces a seismic response that appears as a horizontal boundary in the subsurface, commonly termed a flat spot or fluid contact.

Flat spots can often be difficult to detect in seismic data. One common technique applied to enhance the appearance of flat spots is an optical smash. By summing data in a given direction (usually horizontally in the inline or cross-line direction), reflectors that are horizontal become enhanced while dipping reflectors of opposite polarity tend to cancel each other out, thus resulting in an accentuated flat spot.

Figure 5:
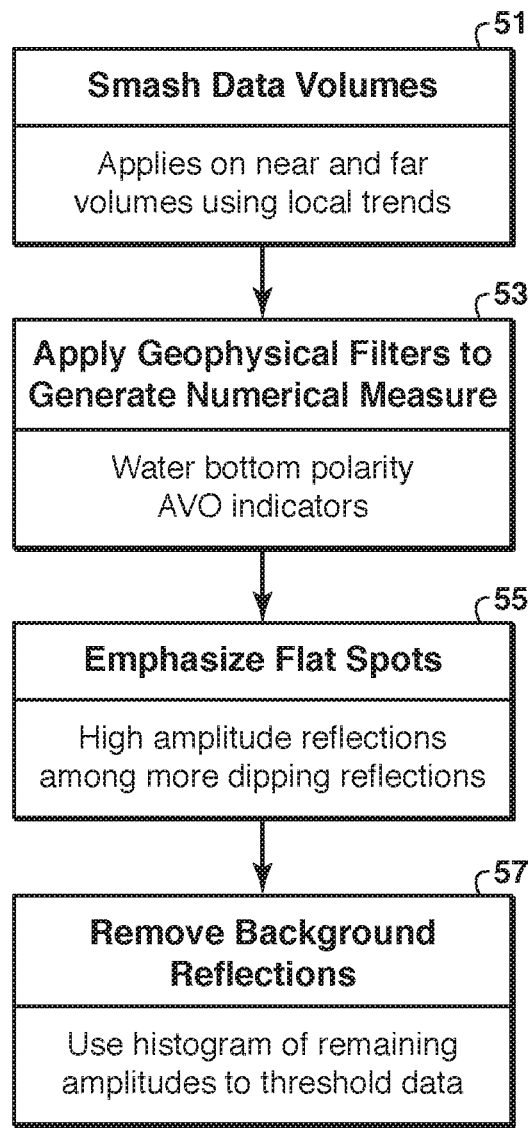
FIG. 5 is a flowchart illustrating how seismic flat spots may be enhanced and better defined.
Figure 6:
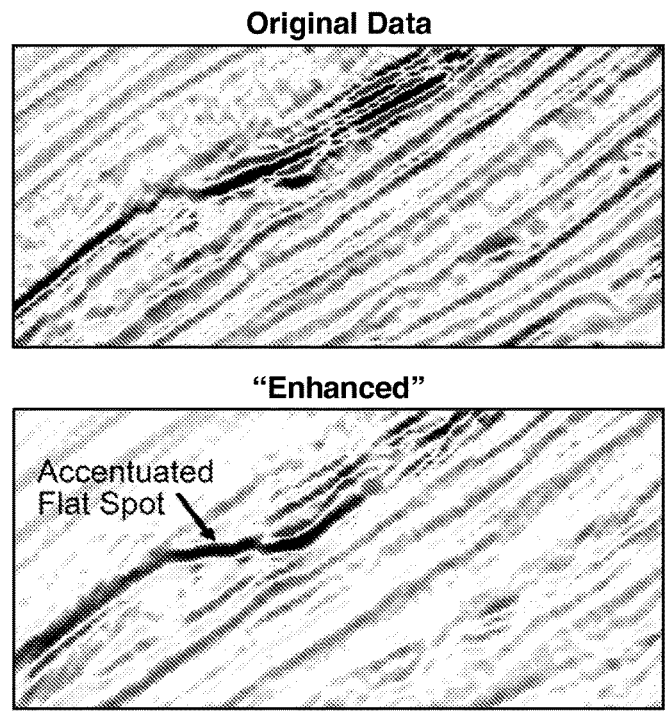
FIG. 6 shows the results of flat spot enhancement by using the method of FIG. 5.

Smashing of seismic data is one of the preferred steps (step 51) performed in an algorithm for flat spot definition such as FIG. 5, which may be incorporated within the DHI definition system. The preferred calculation, as performed here, however, is applied in differing directions throughout the volume, based on the local trending dip. This significantly enhances horizontal reflections to the exclusion of all dipping signal, as shown in FIG. 6.

In addition to smashing the seismic data, it may be preferable to apply one or more other filters (step 53) to aid in identifying the most prospective flat spots in a volume.

First, the geophysical signature of flat spots can be manipulated to remove data that cannot physically be a fluid contact reflection. For example, since the impedance change from a hydrocarbon-saturated to a brine-saturated reservoir is always an increase, as is the change from above the sea floor to below due to the transition from water to rock, any flat spot will have the same polarity as the water bottom. Therefore, any reflections with a polarity opposite that of the water bottom can be filtered out. Second, a flat spot can display only a slight increase, or no change, in amplitude with offset (AVO). Thus any reflections exhibiting a decrease with offset, or an actual phase change, can be removed as well.

The algorithm for flat spot enhancement in the DHI definition system may incorporate one or more additional filters to emphasize fluid contacts (step 55), all built off the geometric nature of these flat reflections. One such filter removes all remaining flat, high amplitude reflections that do not differ greatly in dip from their relative surroundings ("railroad track" reflections). A flat spot should have a measurably different dip than the reservoir reflections above and below it. Any bright, flat reflection that is somewhat parallel to its surrounding reflectors can therefore be discounted. In constructing such a filter, this system may utilize the normal vectors of the local dip as a measure of "flatness" (with the dip of the local water bottom being considered "flat" or 0° with respect to the horizontal). Those regions with a normal of 90° to the dip of the water bottom are thus deemed "flat".

Other filters that can be applied within the flat spot definition algorithm help boost the amplitudes of remaining flat reflections (step 57) with respect to local dipping reflections (e.g., histogram thresholding). The final result of the flat spot calculation is a volume derived from the original seismic data that reveals the flat spots most likely to be indicators of hydrocarbon.

Amplitude Fit-to-Structure

Another DHI indicator related to flat spots is termed "fit-to-structure". Fit-to-structure measures the degree to which an anomaly conforms areally to a depth contour, consistent with the presence of hydrocarbon (e.g., brightening/dimming across a specific elevation).

Figure 8:
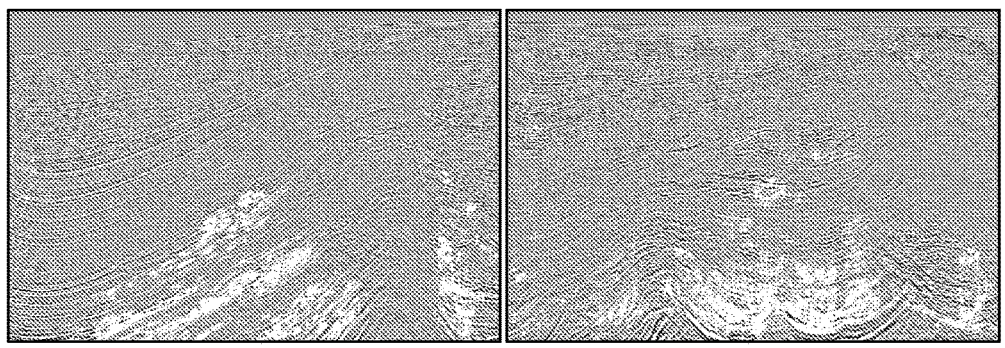
FIG. 8 shows two examples of regions (white pixels) found to exhibit strong fit-to-structure behavior of seismic amplitudes, where the regions were found using the method of FIG. 1 with the fit-to-structure DHI quantified by the method of FIG. 7.
Figure 7:
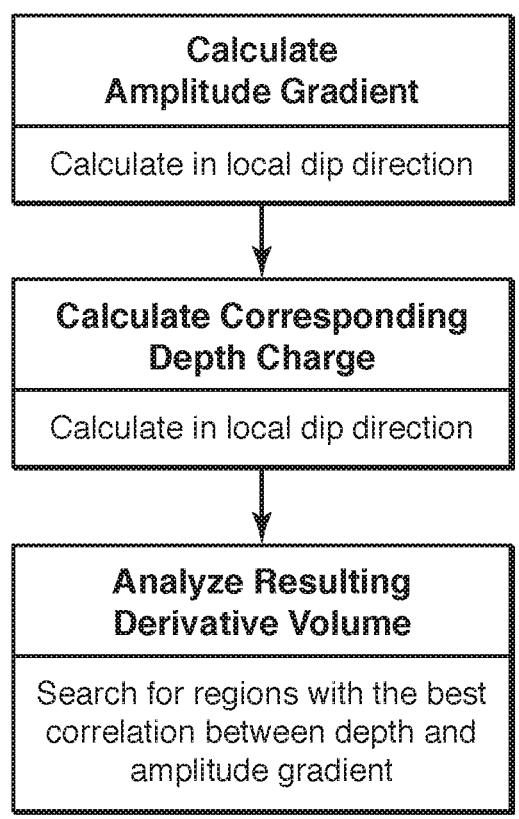
FIG. 7 is a flowchart for quantifying regions that exhibit fit-to-structure behavior.

Based on the definition of the attribute, one could employ a semi-automated algorithm, such as that outlined in the self-explanatory FIG. 7, that searches an entire data volume and identifies those regions exhibiting the best fit-to-structure. The calculation might involve measuring the correlation between depth and amplitude in the direction of local dip, with attention that this calculation be applied in the appropriate directions within the volume to assure measurements are done with relation to structural variations. The final result of the fit-to-structure calculation may be a derivative volume of data with highlighted regions that exhibit the strongest fit-to-structure indicators; two such examples are shown in FIG. 8.

Lateral Amplitude Contrast and Down-Dip Terminations

Hydrocarbon accumulations in the subsurface are restricted to a trapping container. As the physical properties of hydrocarbon-saturated reservoirs are different from those of brine-saturated reservoirs or non-reservoirs, an areally restricted hydrocarbon accumulation should be indicated by a seismic anomaly that is also areally restricted. Measuring the degree to which a seismic anomaly is areally restricted is therefore a way to assess the anomaly's quality as an indicator of hydrocarbon. The degree to which a seismic anomaly is areally restricted can be quantitatively analyzed. One measure, termed lateral amplitude contrast, calculates the degree of amplitude change between the anomaly (the hydrocarbon-saturated reservoir) and the adjacent stratigraphically equivalent deposits (the brine below or non-reservoir above). A second measure, termed down-dip terminations, calculates the spatial abruptness of the change in the seismic response from the hydrocarbon-saturated reservoir to the brine-filled reservoir, crossing over the presumed hydrocarbon-water contact.

Analyses of lateral amplitude contrasts and down-dip terminations may be interdependent. For instance, when amplitude variation is the primary indicator of hydrocarbons, abrupt terminations imply significant lateral amplitude contrast. However, when amplitude variation is not the primary indicator of hydrocarbons, lateral amplitude contrasts will not be significant, yet abrupt terminations, possibly including a phase change, may be quite evident.

The DHI definition system may therefore include two different inventive algorithms, one that measures lateral amplitude contrasts in seismic data and another that measures down-dip terminations. Both may use similar principles. For both measurements, it is preferable to consider how amplitude is changing (magnitude and sharpness) in the direction of the dipping reservoir. Therefore, all calculations described within this section are preferably performed in the direction of local dip.

Figure 9:
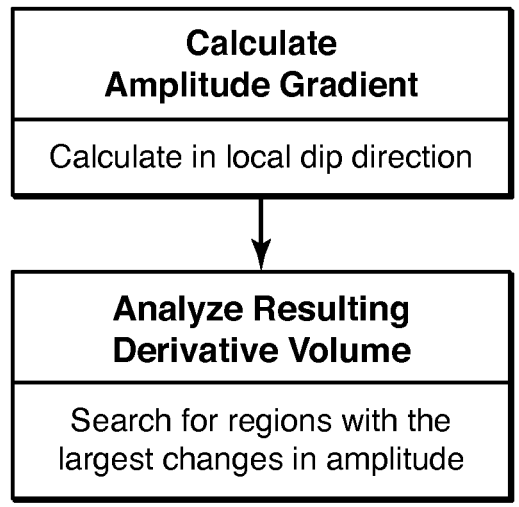
FIG. 9 is a flowchart for quantifying regions with large lateral amplitude contrasts.

The DHI definition system of the present invention may include an algorithm that calculates amplitude changes in the local dip direction and highlights those regions with the largest changes in amplitude (FIG. 9). This is in contrast to the amplitude anomaly calculation performed on surfaces representative of reflection events. Instead, the lateral amplitude contrast calculation is preferably performed in a more local manner (e.g., pixel-by-pixel), in the direction of dip, capturing significant changes in amplitude that occur along a dipping reservoir (i.e., between a hydrocarbon and brine).

Figure 10:
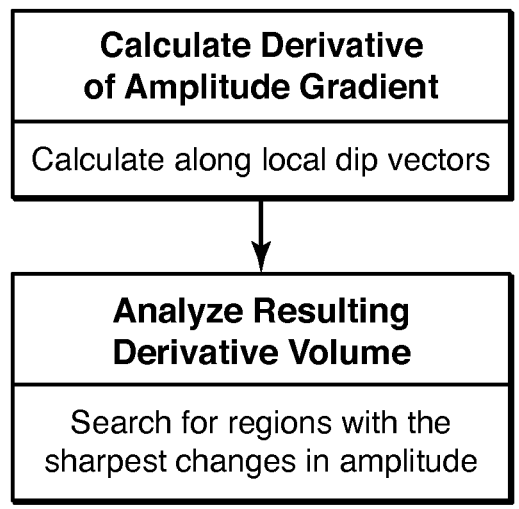
FIG. 10 is a flowchart for quantifying regions that exhibit down-dip terminations.

A down-dip termination algorithm (FIG. 10) incorporated in the DHI definition system may apply a different calculation in the same local neighborhood defined by the direction of local dip. The calculation measures sharp changes in amplitude, as opposed to large changes (as is the case for the lateral amplitude contrast measurement). Put quantitatively, this calculation looks for spikes in the gradient of the amplitude along the transition from hydrocarbon-saturated reservoir to brine.

Figure 11:
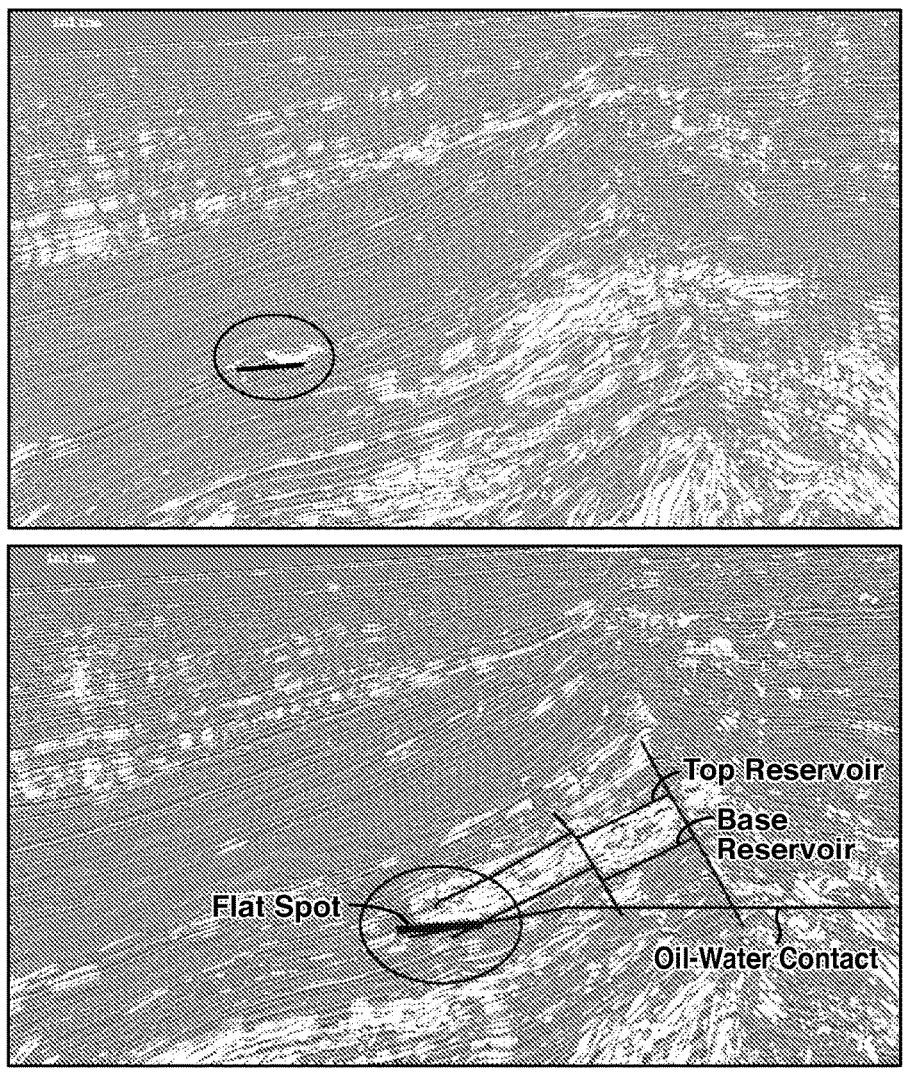
FIG. 11 shows a derivative data volume highlighting regions exhibiting large lateral amplitude contrasts (white pixels) superimposed with flat spots, identified using a DHI definition system of the present invention.
Figure 12:
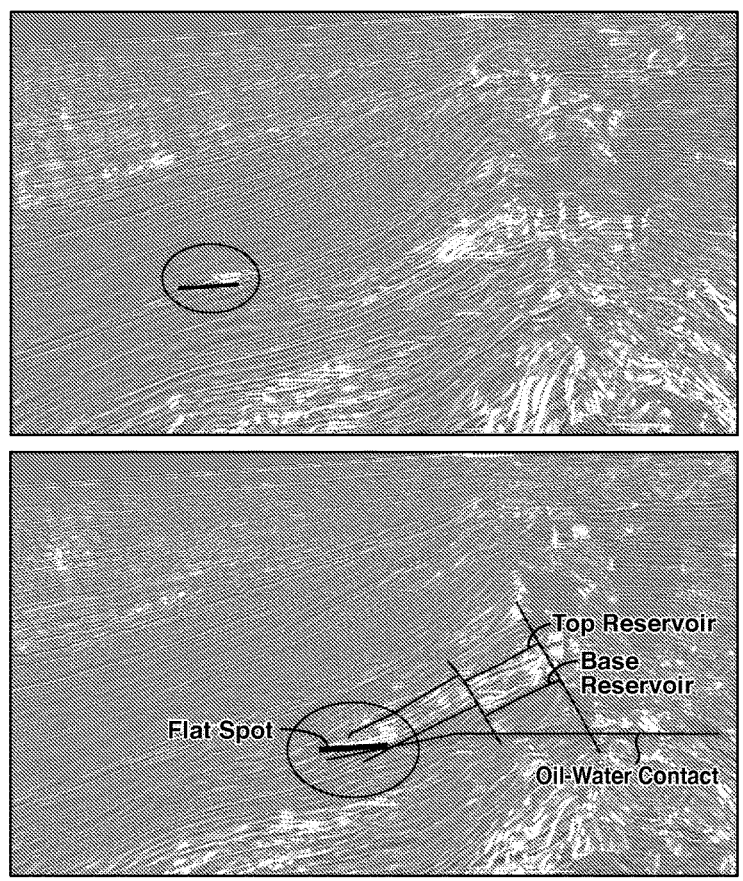
FIG. 12 shows a derivative volume highlighting regions exhibiting sharp down-dip terminations (white pixels) superimposed with flat spots, also identified using a DHI definition system of the present invention.

Both the lateral amplitude contrast calculation and the down-dip termination calculation result in a derivative volume of data that highlights the most prospective locations for hydrocarbons based on the presence of large lateral amplitude contrasts (FIG. 11) and/or sharp, distinct amplitude terminations (FIG. 12).

Other DHI Indicators

The novel DHI indicators described above are all measures of the quality of a potential DHI anomaly. Other indicators that may be incorporated into the DHI definition system include, but are not limited to: (1) gas chimneys, (2) velocity sags, (3) frequency attenuation, and (4) electrical resistivity anomalies (see, for example, U.S. Pat. No. 6,603, 313, "Remote Reservoir Resistivity Mapping" to Srnka et al.). In addition, one may wish to include measurements of the confidence in a DHI anomaly. For example, the density and quality of the seismic data, quality of well calibration, and the fit of the observed seismic signature to expectation are all important factors in assessing a potential hydrocarbon opportunity. Preferably, such DHI indicators are utilized as additional inputs in the current DHI definition system if available and deemed valuable.

Grouping

Preferably, the subsurface is partitioned into at least two groupings for analysis and, if warranted, a background that contains the space not being analyzed. Definition of at least two groupings allows for comparing or contrasting of different groupings and, if desired, ranking of different groupings. One preferred method for grouping the subsurface for analysis and ranking is to declare each sample to be its own grouping. Another preferred method is to define a grouping around essentially every sample of the dataset where a grouping consists of a little neighborhood anchored at a sample point. This particular method of grouping consists of overlapping regions. Other methods of groupings include, but are not limited to: (1) blocking the subsurface into larger non-overlapping regions, for example into regular bricks, or triangular, quadrilateral, or hexagonal prisms aligned with the subsurface layer structure, (2) defining groupings by another earth model, for example using the cells of a collocated geologic model or reservoir flow model, and (3) grouping based on secondary attributes of the seismic data. Details of the groupings are largely irrelevant for the inventive method. Groupings may overlap, be mutually exclusive, or overlap at some places and be mutually exclusive at others. Groupings may cover the entire data volume (they completely cover the dataset) or may be incomplete with regions not partaking in any grouping (they belong to a background).

The simplest method of grouping is single voxels, but the results from such a grouping may be erratic because the success criteria may not be consistently satisfied in a given region. For practical purposes, one may want to agglomerate single voxels that satisfy the criteria into larger contiguous regions, but depending on the specific success criteria, the larger regions may be patchy or spanning large portions of the data volume. Single voxels, however, are the building blocks of data volumes and thus form a natural suboptimal grouping.

A preferred method of grouping is a cluster or neighborhood of voxels anchored at a specified voxel. The computed DHI definitions and the associated criteria of success are attributed either to the anchor location or the entire group. If definitions and criteria are attributed to the anchors, then it is advantageous to form overlapping groupings, e.g., anchoring a grouping at essentially every sample location. On the other hand, if definitions and criteria are attributed to entire groupings, then it is advantageous to utilize non-overlapping groupings.

A particular scheme of non-overlapping groupings is breaking the data volume into regular Cartesian blocks or bricks, for example samples of size 20×20×20. Regular Cartesian bricks or blocks, however, will cut through strata and layers. An alternative scheme is to align the bricks or blocks to the geologic strata. In this scheme, there will be differences in size and shape between the groupings because they conform to the geologic layering. A particular embodiment of grouping conformal to strata is definition of groups by the cells of a collocated geological model or reservoir simulation model.

Another preferred grouping method is based on one or multiple auxiliary seismic attributes. Groupings are created by a procedure entailing thresholding of specified attributes followed by connected component analysis, or a similar process, to generate contiguous regions embedded in a background. This procedure can be thought of as single- or multi-volume seed detection. A preferred attribute to control the grouping is saliency, an attribute highlighting locations where one or multiple datasets are statistically anomalous compared to other locations. Examples of saliency attributes are disclosed in PCT Patent Application Publication WO 2010/056424 "Windowed Statistical Analysis for Anomaly Detection in Geophysical Datasets" by Kumaran et al. A practitioner of the art will easily find other saliency definitions also disclosed in the literature.

In a particular embodiment of the invention, groupings are not only formed but also prioritized. This prioritization defines the order in which groupings are analyzed through the computation of DHI definitions and evaluation of the success criteria. Prioritization may be specified by the user, be based on a secondary seismic attribute such as saliency, or be based on group size in order to analyze the most relevant groupings. Using such a prioritization, it may not be necessary to analyze all groups. This preferred embodiment of the present inventive system computes DHI definitions and evaluates success for groupings in a specified sequence until a prescribed number of groupings has been analyzed, a prescribed number of groupings satisfy the success criteria, a prescribed threshold of the secondary attribute is exceeded, or a prescribed time allowed for analysis has expired, or another stopping point is reached.

Success Criteria

Figure 13:
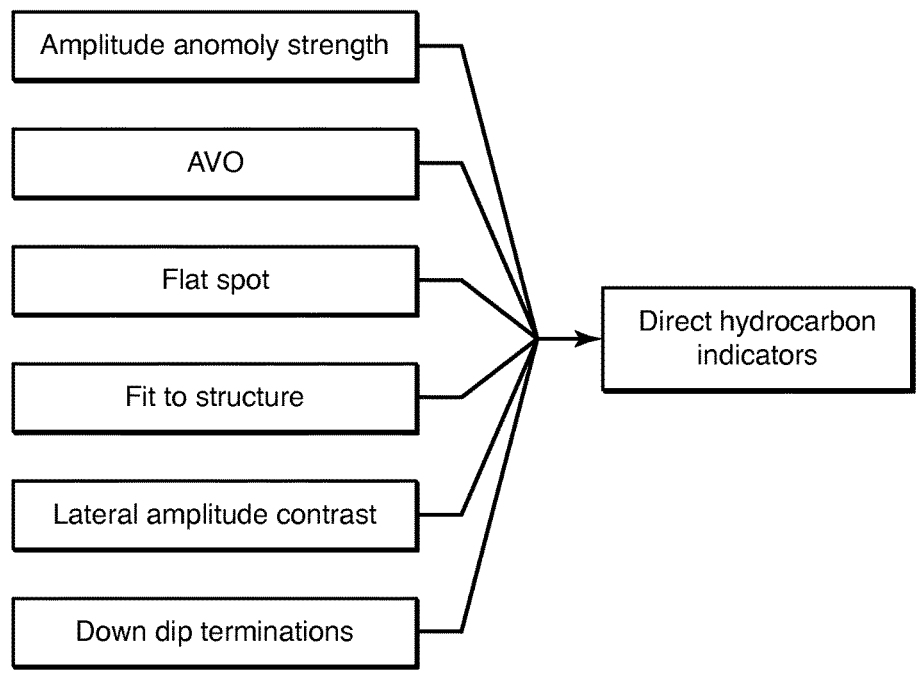
FIG. 13 is a schematic diagram showing a network that integrates different hydrocarbon indications into one number for use in one embodiment of the present inventive method.

The last step of the invention in the embodiment of FIG. 3 is identification of leads among all the groupings based on their DHI definitions. The interpreter or the system specifies at least one success criterion with which groupings are compared. The criterion can be as simple as a set of thresholds that all the selected DHI definitions need to exceed in order to declare a grouping as a region that might contain hydrocarbons. On the other hand, the criterion could be a threshold applied to a, possibly complicated and non-linear, process that integrates multiple selected DHI definitions. For example, a computer algorithm might integrate, for each grouping, the numerical scores for many DHI's into a single number, a composite score for the grouping. (See FIG. 13.) The groupings could then be ranked according to composite scores, or those groupings with composite scores exceeding a selected threshold could be identified for further evaluation.

In some embodiments of the invention, the success criteria are developed as an extension of some declaration of success (a grouping potentially containing hydrocarbons based on geophysical anomalies) or failure (a grouping unlikely to contain hydrocarbons based on weak or absent geophysical anomalies). In some embodiments, the success criteria also assign to every group a degree of geophysical anomalousness based on selected DHI definitions. Such a degree of anomalousness could be interpreted as the likelihood that a grouping contains hydrocarbons. Yet in other embodiments of the invention, the success criteria are extended to include binning or ranking of groupings based on geophysical anomalousness expressed by selected DHI definitions.

In one preferred embodiment of the invention, the user or the algorithm specifies at least one criterion to determine whether a grouping demonstrates a positive DHI response or a negative one, or in other words, whether there is a geophysical indication of potential hydrocarbons or not. A preferred method to define success criteria is specification of thresholds that the selected DHI definitions need to exceed. The success criterion could be that all selected DHI definitions exceed specified thresholds. Variations of this criterion could be that at least a specified number, out of all selected DHI definitions, exceed specified thresholds. Yet another variation of this criterion is that one set of specified DHI definitions exceeds the set thresholds while at least a specified number of DHI definitions contained in another set exceeds the thresholds.

Other definitions of success criteria are based not on whether at least some specified DHI definitions exceed individually specified thresholds or not, but instead on whether some combination of specified DHI definitions exceeds a specified threshold or not. Combinations include the sum or product of specified DHI definitions. Combinations also include the weighted sum or weighted product of specified definitions. Yet other combinations can be formed by integration of specified DHI definitions using a neural network, a Bayesian network, or any other linear or nonlinear procedure.

Instead of forming only one combination of DHI definitions, one can form multiple combinations, specify thresholds for each combination, and require that in order to declare success or failure, some specified combinations exceed their thresholds and at least a given number of other specified combinations exceed their thresholds.

In some embodiments of the invention, the success criteria are augmented with the estimate of confidence disclosed above in this document, either by including the estimate of confidence directly into the criteria, for example by weighting the DHI definitions, or by using confidence as a secondary ranking measure.

A potential weakness of some invention embodiments described above is their "all or nothing" nature. A grouping is declared to be either a success or failure based on some threshold criterion. This approach is sometimes called gate logic. If thresholds are set high, very few groupings are expected to succeed and economic hydrocarbon reserves could be missed. If thresholds are set low, however, more groupings succeed than can be handled manually in a timely manner in later stages of the overall exploration process. For example, the more groupings that succeed, the longer it will take an interpreter to analyze the hydrocarbon potential of the successful groupings beyond geophysical anomalousness.

In some embodiments of the invention, the success criteria are therefore extended to assign to every grouping a degree of geophysical anomalousness based on selected DHI definitions. Such a degree of anomalousness could be interpreted, for example, as an estimate of how likely it is that groupings contain hydrocarbons. In some embodiments of this mode, groupings are classified beyond 'success' or 'failure'. Instead, groupings might be declared as 'success', 'likely success', 'neutral, 'likely failure', and 'failure'. Groupings are thus binned into a certain number of bins or categories. Classification can be achieved by voting based on thresholded definitions or thresholded combinations, for example by counting how many thresholds are exceeded. Classification can also be achieved by setting up a sequence of progressively weaker thresholds for definitions or combinations and subsequent categorization based on which thresholds are exceeded.

In some embodiments of the present invention, classification of groupings implies ranking of groupings, and the success criteria are therefore extended to rank or order groupings by their DHI definitions or measures of geophysical anomalousness. Preferably, at least two specified definitions are combined into one value that is used to rank groupings.

Another form of classification is ranking of groupings that are assigned to the same bin. In some embodiments of the inventive system, ranking within groups is done based on the numerical values obtained by combination of DHI definitions. In other embodiments, ranking is done using a secondary criteria, such as the size of a grouping or with values of a secondary dataset at the location of a grouping.

In some embodiments of the inventive system, selection of DHI definitions and selection of success criteria are guided by the need or desire to locate a specific kind of hydrocarbon reservoir. Hydrocarbons found in nature include: high concentrations of thermal and/or biogenic gas, found in conventional reservoirs or in gas hydrates, tight reservoirs, fractured shale, coal, condensates, crude oils, heavy oils, asphalts and tars. Each form of hydrocarbon can have a different DHI signature even when keeping all other parameters, such as depth or rock types, equal. Specific selection of DHI definitions and specific selection of success criteria can depend on the desired form of hydrocarbon or the desired location and nature of the reservoir. In some embodiments of the inventive system, the interpreter or the system analyzes well data, if available, and builds a geologic model with one or multiple scenarios for fluid content to determine the prediction power of the different hydrocarbon indicators in different parts of the data. One reason for performing this analysis is that the same type of hydrocarbon accumulation may be exposed at different degrees and by different hydrocarbon indicators when at different depths, or more specifically, at different regimes of pore pressure and/or compaction. Another reason is that stratigraphic effects (e.g., amplitude tuning from thin layers or transitions from one facies into another one) may overpower a fluid response. Thus, modeling enables spatially varying selection or weighting of the different DHI definitions based on more detailed geologic knowledge.

Commonly, hydrocarbon reservoirs are classified to be Class 1, 2, 3, or 4 based on their AVO signature (FIG. 4). In one particular embodiment of the invention, the interpreter or an algorithm selects DHI definitions and success criteria that are particularly sensitive to highlighting a desired Class, for example based on experience or results of modeled prediction power. In a preferred embodiment of the invention, the interpreter selects at least one Class of hydrocarbon reservoirs and selects DHI definitions and success criteria individually for each of the selected Classes.

In another embodiment of the invention, the interpreter selects at least two specific kinds of targets, such as gas in a fractured reservoir and crude oil in a shallow sand, and DHI definitions and success criteria for each target. The interpreter then uses the invention not only to bin or rank groupings, but also to classify groupings by target kind.

The Complete System

Figure 2:
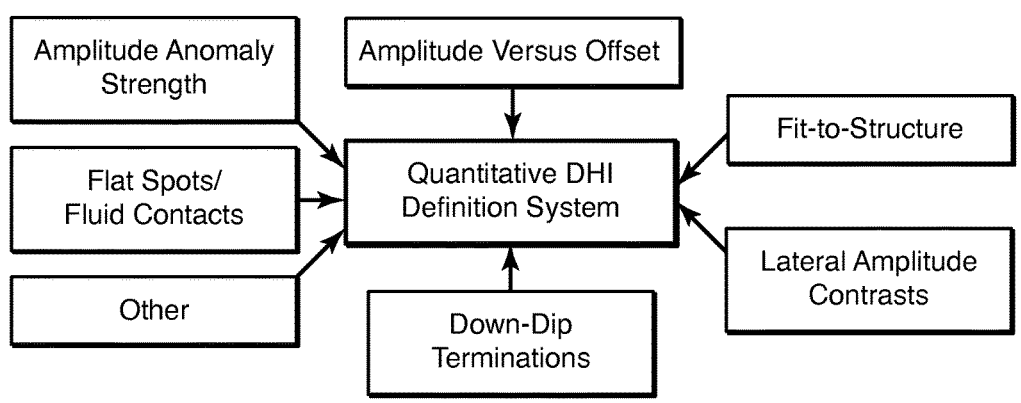
FIG. 2 is a conceptual diagram illustrating how the DHI definition system of the present invention may work.

All of the algorithms 33 that define and compute quantitative DHIs (sometimes referred to herein as the DHI definition system—see FIG. 2) are preferably independent calculations that can incorporate user input and available geologic context. A myriad of different combinations of potential DHI indicators can be analyzed to account for variability in reservoir class, geologic setting, reservoir characteristics (e.g., consolidation state), data quality, etc. Ideally, any given hydrocarbon will exhibit some combination of DHI indicators. However, the presence of one direct hydrocarbon indicator may be offset or masked by that of another, thereby hiding any indication of a hydrocarbon occurrence. Furthermore, depending on physical properties and geologic environments, a potential DHI may not always be easy to distinguish from the general stratigraphic reflectivity. As amplitude strength and AVO quality diminish, for example, the quality of the anomaly definition (e.g., down-dip terminations) becomes more important in distinguishing a stratigraphic anomaly from a potential DHI anomaly. The flexibility of the present invention allows for many possible scenarios (e.g., different combinations of DHI indicators, specific geologic settings, etc.) to be considered and tested rapidly.

The DHI definition system can be used as a stand-alone tool to search entire data volumes for hydrocarbon opportunities based solely on the presence of DHIs, which is primarily how the invention has been discussed in the foregoing description. Another application of the system is as an input tool or add-on for other technologies that similarly search for hydrocarbon leads using fundamental geologic/geophysical concepts to manipulate the data to highlight regions of interest, for example as disclosed in PCT Patent Application No. PCT/US2011/33519, "System for Seismic Hydrocarbon System Analysis" by Imhof et al.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. It should be apparent from the foregoing description that at least some of the steps in the present inventive method are performed on a computer, i.e. the invention is automated, but allowing for user input.

The invention claimed is:

1. An automated method for identifying subsurface locations with hydrocarbon potential from a seismic data volume, comprising:
obtaining a seismic data volume, wherein a plurality of voxels form an entirety of the seismic data volume;
dividing, with a computer, the seismic data volume into two or more groupings that collectively span every one of the plurality of voxels, each grouping representing a different subsurface location and including regions other than those predefined as being hydrocarbon opportunities;
using the computer to apply, to each of the two or more groupings that collectively span every one of the plurality of voxels and include regions other than those predefined as being hydrocarbon opportunities, one or more algorithms that define, in a quantitative way, and compute at least two direct hydrocarbon indicators from the seismic data volume;
using the computer to evaluate the two or more groupings for hydrocarbon potential based on applying one or more selected criteria to the computed direct hydrocarbon indicators; and
generating, with the computer, one or more images or volumes identifying regions corresponding to the computed direct hydrocarbon indicators.

2. The method of claim 1, wherein each grouping of the two or more groupings is one of: an individual data voxel; a small cube of adjacent data voxels; fabric-aligned blocks or layers of data voxels; and a contiguous group of data voxels.

3. The method of claim 1, wherein the at least two direct hydrocarbon indicators comprise at least one of a group consisting of: seismic amplitude relative to background; seismic amplitude variation with source-receiver offset, called AVO; or seismic amplitude variation with reflection angle, called AVA; fluid contact reflections, i.e. seismic amplitude flat spots; seismic amplitude fit-to-structure; lateral seismic amplitude contrast, i.e. seismic amplitude relative to that of laterally equivalent stratigraphy; and abrupt down-dip terminations in seismic amplitude.

4. The method of claim 1, wherein the evaluation of the groupings for hydrocarbon potential comprises a ranking of the groupings using either gate logic or voting.

5. The method of claim 4, wherein voting is used for the ranking of the groupings, wherein the one or more algorithms compute a number, or score, for each direct hydrocarbon indicator, and then apply a selected threshold to each number or score, and voting is based on how many thresholds are exceeded for each grouping.

6. The method of claim 4, wherein the ranking of the groupings is a probabilistic ranking.

7. The method of claim 1, wherein the one or more algorithms compute a number, or score, for each direct hydrocarbon indicator, and then combine the scores to generate a single combined score for each grouping.

8. The method of claim 1, further comprising augmenting the hydrocarbon potential evaluation with a non-seismic hydrocarbon indicator based on one or more electromagnetic field or resistivity anomalies.

9. The method of claim 1, wherein one of the at least two direct hydrocarbon indicators is seismic amplitude fit-to-structure, which indicator is quantified by steps comprising:
calculating seismic amplitude gradient in local dip direction;
calculating corresponding depth change in local dip direction;
creating a derivative seismic data volume from the calculated seismic amplitude gradient and the calculated corresponding depth change; and
quantitatively measuring correlation between depth and amplitude in the derivative seismic data volume.

10. The method of claim 1, wherein one of the at least two direct hydrocarbon indicators is lateral seismic amplitude contrast, which indicator is quantified by steps comprising calculating seismic amplitude gradient in local dip direction.

11. The method of claim 1, wherein one of the at least two direct hydrocarbon indicators is abrupt down-dip terminations in seismic amplitude, which indicator is quantified by steps comprising calculating derivative of seismic amplitude gradient along local dip vectors.

12. The method of claim 1, wherein each quantitative direct hydrocarbon indicator is displayed as a derivative seismic data volume, and each such derivative seismic data volume is searched according to the one or more selected criteria.

13. The method of claim 1, wherein each direct hydrocarbon indicator for a particular grouping is a single measure computed for the entire grouping, or is based on computation of the direct hydrocarbon indicator at multiple locations, or cells, within the grouping.

14. A computer program product, comprising a non-transitory computer usable medium having a computer readable program code embodied therein, said computer readable program code adapted to be executed to implement a method for identifying subsurface locations with hydrocarbon potential from a seismic data volume, said method comprising:
obtaining the seismic data volume, wherein a plurality of voxels form an entirety of the seismic data volume;
dividing the seismic data volume into two or more groupings that collectively span every one of the plurality of voxels, each grouping representing a different subsurface location and including regions other than those predefined as being hydrocarbon opportunities;
applying, to each of the two or more groupings that collectively span every one of the plurality of voxels and include regions other than those predefined as being hydrocarbon opportunities, one or more algorithms that define, in a quantitative way, and compute at least two direct hydrocarbon indicators from the seismic data volume;

ranking or evaluating the two or more groupings for hydrocarbon potential based on applying a selected one or more of selected criteria to the computed direct hydrocarbon indicators; and generating, with the computer, one or more images or volumes identifying regions corresponding to the computed direct hydrocarbon indicators.

15. The method of claim 1, further comprising augmenting the hydrocarbon potential evaluation with a confidence measure for each of the direct hydrocarbon indicators.

16. The method of claim 1, further considering a measure of confidence in each computed direct hydrocarbon indicator when evaluating the groupings for hydrocarbon potential.

17. The method claim 1, further comprising identifying locations where the at least two direct hydrocarbon indicators occur simultaneously.

* * * * *